Figure 1:
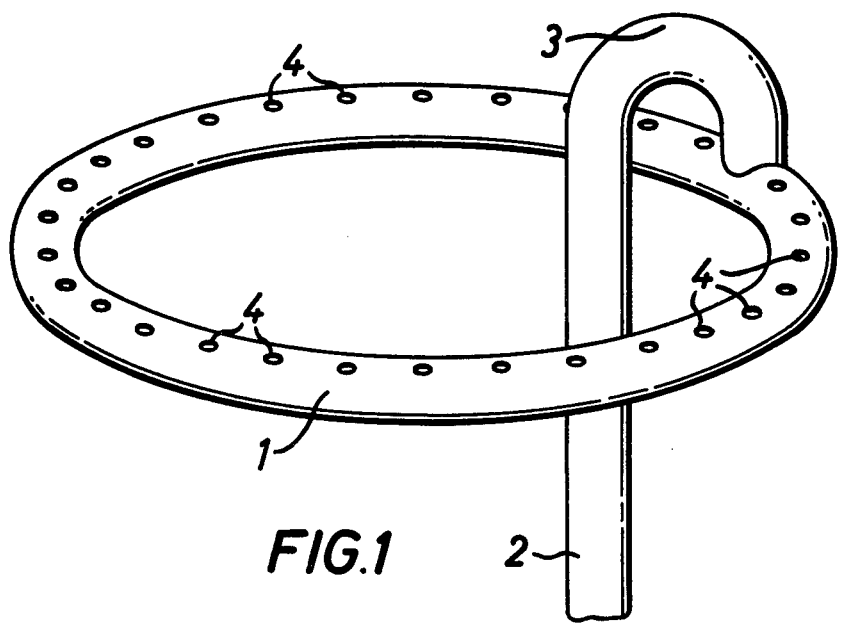

United States Patent [19]
Sutton

[11] 4,322,384
[45] Mar. 30, 1982

[54] SPARGER NOZZLES

[75] Inventor: Gordon W. Sutton, Bisley, England

[73] Assignee: The British Petroleum Company Limited, London, England

[21] Appl. No.: 120,870

[22] Filed: Feb. 12, 1980

Related U.S. Application Data

[63] Continuation of Ser. No. 890,961, Mar. 28, 1978, abandoned.

[30] Foreign Application Priority Data

Apr. 1, 1977 [GB] United Kingdom ............... 13832/77

[51] Int. Cl.³ .......................... B01J 8/24; F27B 15/10
[52] U.S. Cl. ................................. 422/144; 239/548; 239/601; 422/310
[58] Field of Search ............... 422/140, 144, 172, 194, 422/207, 310; 261/121, 93, DIG. 25; 239/556, 557, 548, 601, 352

[56] References Cited

U.S. PATENT DOCUMENTS

| 2,166,300 | 7/1939 | Komar | 239/550 |
|---|---|---|---|
| 2,314,525 | 3/1943 | Summers | 239/557 |
| 2,761,880 | 9/1956 | Gerber et al. | 422/218 |
| 2,964,382 | 12/1960 | Hall, Jr. | 239/548 X |
| 2,968,126 | 1/1961 | Richardson | 239/557 X |
| 3,378,349 | 4/1968 | Shirk | 422/195 |
| 3,503,554 | 3/1970 | Clifton | 239/550 X |
| 3,785,779 | 1/1974 | Li et al. | 239/548 |
| 3,997,300 | 12/1976 | Boctwright et al. | 261/121 R |
| 4,062,654 | 12/1977 | Shigeyusa et al. | 261/121 R |
| 4,150,090 | 4/1979 | Murphy et al. | 422/144 |

Primary Examiner—Michael S. Marcus
Attorney, Agent, or Firm—Morgan, Finnegan, Pine, Foley & Lee

[57] ABSTRACT

Sparger ring for catalytic cracker regenerator comprises a plurality of converging nozzles for air entry to reduce erosive wear.

8 Claims, 4 Drawing Figures

SPARGER NOZZLES

This is a continuation of application Ser. No. 890,961, filed Mar. 28, 1978, now abandoned.

This invention relates to improved nozzles suitable for fluid (gas and or liquid) distribution from spargers and more particularly, although not exclusively, to nozzles suitable for use in the sparger ring of a fluidised catalytic cracker regenerator.

A catalytic cracker cracks high boiling petroleum fractions to lower boiling fractions and comprises in essence a reactor, a regenerator, a catalyst circulation system and a fractionation system. Feedstock is injected into a riser line where it contacts hot, freshly regenerated catalyst and passes to the reactor. Cracking takes place in the riser and in the reactor. As a result of cracking, the catalyts becomes coked with a carbonaceous deposit and loses its activity. It is therefore transferred, often pneumatically, to the regenerator where it is fluidised and the coke burnt off under carefully controlled conditions. A recent tendency is to increase the amount of cracking which takes place in the riser and to utilise the reactor primarily as a catalyst separating zone or in some cases to eliminate it, but this does not affect the need of the catalyst for regeneration.

Although air is often used to transfer coked catalyst to the regenerator and cause the catalyst to become fluidised inside the regenerator, additional air, known as combustion air, is necessary to control and complete the catalyst regeneration and to improve fluidisation around the inner wall of the regenerator. This additional air is supplied, for example, by means of a ring, termed a sparger ring, situated at or near the base of the regenerator. A typical sparger ring encircles the interior of the base of the regenerator and contains a large number (several hundred) of nozzles from which air emerges. Air may be conveniently supplied to the ring by a single offset line joining the sparger ring with possibly a 180° return bend, i.e., a "swan neck" configuration. Air distribution from the sparger may be via nozzles formed by holes drilled in the sparger ring surrounded by cylinders of greater diameter than the holes. In relation to the air flow, these nozzles therefore diverge. Alternatively, there may be no nozzles; air outlets being provided by round holes or slots or similar.

When using abrasive catalysts, such nozzles or apertures in the sparger wall have a tendency to erode. The incidence of erosion can result in inefficient catalyst regeneration by upsetting air distribution. On occasions the erosion can be severe, thus causing premature shut down of a catalytic cracker or shorter intervals between maintenance with subsequent loss of production and increased maintenance costs.

We have now discovered that the use of converging nozzles in a sparger ring in an erosive environment tends to reduce erosion because it gives a more uniform energy profile across the nozzle exit section. The converging nozzle also provides a means of rapidly correcting fluid disturbances after a general change in direction of fluid flow from its source.

Thus according to the present invention there is provided a sparger comprising a plurality of converging nozzles.

Preferably the sparger is in the form of a ring.

By "converging nozzle" is meant a nozzle, the outlet of which has a smaller cross sectional area than its inlet in relation to the direction of flow of fluid when in use.

Within the above concept there are numerous ways in which convergency may be achieved. Thus, for example, converging nozzles may be drilled directly through the wall of the sparger, although for practical reasons this is not preferred. Tapered chimneys may be affixed to holes of uniform cross section in the sparger either directly or at the end of further sections of uniform cross section. Tapered inserts may be placed into holes or cylinders of uniform cross section.

Existing diverging nozzles wherein a chimney of larger cross section is superimposed upon a hole of smaller cross section can be converted to converging nozzles by boring out the hole to match the chimney and capping the chimney with a converging nozzle or inserting a converging nozzle into it.

Suitably the nozzles converge at an angle in the range from 1° to 30°, preferably from 4° to 10°, most preferably about 6°, all angles being measured from the vertical.

Providing the preferred converging nozzles with a parallel entry results in an improved performance.

Suitably the ratio of the cross-sectional area of the outlet to the inlet of the nozzle is in the range 0.10 to 0.95, preferably in the range 0.5 to 0.8.

No advantage is to be gained by extending the length of the chimney by more than 5 times internal diameter to provide a parallel wall inlet to the converging nozzle section.

It is believed, although the applicant does not intend to be bound by the following theory, that erosion in a diverging or parallel nozzle is caused by non-uniform distribution of gas across the nozzle exit with areas of low exit velocity or even flow reversal with local particle entrainment at a vortex within the nozzle on the upstream side (being the area of wall closest to the source of gas supply) and subsequent particle ejection at high velocity from the nozzle against the nozzle wall on the downstream side. In a converging nozzle gas continually accelerates throughout the nozzle until it passes the nozzle exit which is the area of smallest cross section compared with any point throughout its length. The effect of the vena contracta which is considered to be responsible for local erosion within a diverging nozzle because of the induced vortex is therefore eliminated by transferring it to a point beyond the nozzle exit.

It is further believed that the longer nozzle resulting from the presence of a parallel entry gives the air current a better chance to establisha uniform flow pattern, particularly at lower velocities.

As a further result of the improved gas flow given by converging nozzles, energy loss caused by turbulence is reduced and the energy required to provide the gas is reduced for a given flow rate. Alternatively, if the energy input is maintained constant, a greater flow of gas through the nozzles can be achieved.

As stated previously, a catalytic cracker sparger ring generally has hundreds of non-converging outlets. Whilst the installation of converging nozzles can save in air blower requirements, an alternative benefit is to reduce the number of open nozzles or their minimum total cross-sectional area, for example by 25 to 50%. Reducing the total free area without increasing the requirements of the air blower will improve the distribution of the air to each nozzle, i.e., each nozzle will more nearly discharge the same quantity of air.

Whatever the reason, in an erosive environment, both erosion and energy loss are reduced; in a non-erosive environment, the second benefit is still achieved.

Thus although the invention has been described with particular emphasis on a sparger operating in an erosive atmosphere, namely a cat cracker regenerator, the invention is not limited to spargers for operation under erosive conditions. It is of worthwhile application whenever a fluid is to be distributed uniformly since there are advantages to be gained in terms of reduced energy loss as mentioned earlier.

Figure 2:
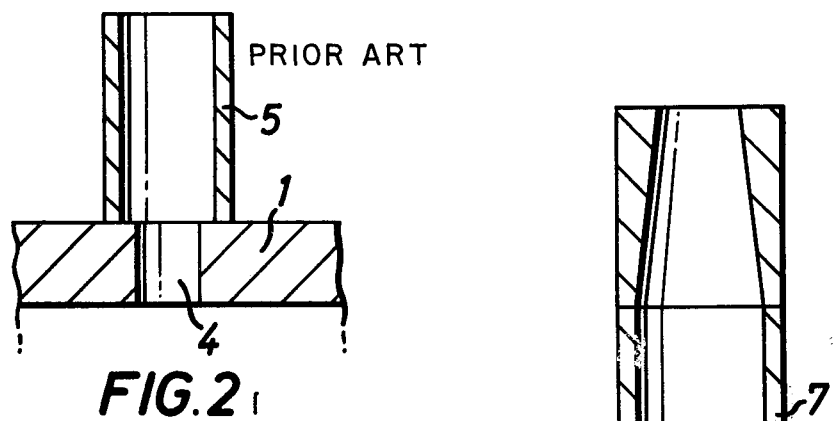
Figure 3:
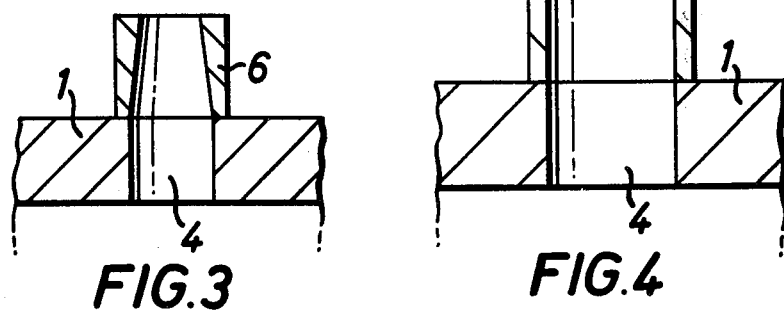
Figure 4:
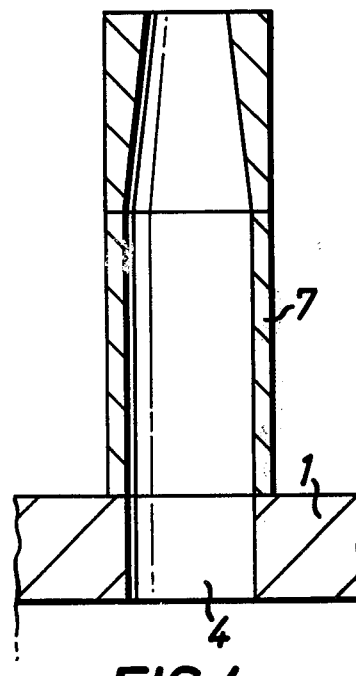

The invention is illustrated with reference to FIGS. 1 to 4 of the accompanying drawings wherein FIG. 1 is a diagrammatic representation of one type of sparger ring, FIG. 2 is a section of a diverging nozzle according to the prior art, FIG. 3 is a section of a converging nozzle and FIG. 4 is a converging nozzle with an extended parallel sided inlet.

The sparger comprises a ring 1 supplied with air by an inlet pipe 2 joining the ring by a swan neck 3. Air emerges from the ring through a number of holes 4.

In a sparger ring according to the prior art, chimneys 5 of greater diameter than the holes 4 are coaxially fitted above the holes.

In a sparger ring according to the present invention, a tapering nozzle 6 is fitted above the hole 4. The inlet to the taper matches the hole 4 and the angle of the taper is 6° from the vertical.

In a typical full size nozzle, dimensions could be as follows:

Thickness of sparger wall 1—1"
Diameter of hole 4—1"
Length of tapering nozzle 6—1.19"
Angle of taper—6° from vertical
Diameter of nozzle 6 at inlet—1"
Diameter of nozzle 6 at outlet—0.75"

It is also desirable, in some applications, to have a parallel tube section 7 with the same internal diameter as the hole in the sparger wall to be coaxially located between the aperture in the wall and the converging nozzle section.

I claim:

1. In a catalytic cracker regenerator having a housing, a bottom portion, an inlet for receiving catalyst, an outlet for discharging catalyst and a sparger situated in said regenerator near said bottom, the improvement, which reduces the tendency of said sparger to erode during use, comprising:

said sparger having a base portion and a plurality of converging nozzles positioned on said base portion, each of said converging nozzles projecting upwardly and having an inlet and outlet for the passage of fluid through said converging nozzles, each of said outlets being smaller in cross-sectional area than the respective inlet to said converging nozzles so that the passage of fluid through said nozzle converges.

2. A sparger according to claim 1 wherein said base portion is shaped in the form of a ring.

3. A sparger according to claim 1 wherein the nozzles converge at an angle in the range 1° to 30°.

4. A sparger according to claim 3 wherein the nozzles converge at an angle in the range 4° to 10°.

5. A sparger according to claim 4 wherein the nozzles converge at an angle of 6°.

6. A sparger according to claim 1 wherein the nozzles have a parallel entry.

7. A sparger according to claim 1 wherein the ratio of the cross-sectional area of the outlet to the inlet of the nozzles is in the range 0.10 to 0.95.

8. A sparger according to claim 7 wherein the ratio of the cross-sectional area of the outlet to the inlet of the nozzles is in the range of 0.5 to 0.8.

* * * * *